United States Patent
Schram

(10) Patent No.: US 10,384,737 B2
(45) Date of Patent: Aug. 20, 2019

(54) MOTORCYCLE SEAT ASSEMBLY WITH HAMMOCK-TYPE SUSPENSION

(71) Applicant: Harley-Davidson Motor Company Group, LLC, Milwaukee, WI (US)

(72) Inventor: Bryan Schram, New Berlin, WI (US)

(73) Assignees: Harley-Davidson Motor Company Group, LLC, Milwaukee, WI (US); Milsco Manufacturing Company, A Unit of Jason Incorporated, Milwaukee, WI (US)

(*) Notice: Subject to any disclaimer, the term of this patent is extended or adjusted under 35 U.S.C. 154(b) by 0 days.

(21) Appl. No.: 15/700,797

(22) Filed: Sep. 11, 2017

(65) Prior Publication Data
US 2018/0273122 A1 Sep. 27, 2018

Related U.S. Application Data

(60) Provisional application No. 62/475,687, filed on Mar. 23, 2017.

(51) Int. Cl.
*B62J 1/02* (2006.01)
*B62J 1/06* (2006.01)
(Continued)

(52) U.S. Cl.
CPC . *B62J 1/06* (2013.01); *B62J 1/02* (2013.01); *B62J 1/08* (2013.01); *B62J 1/12* (2013.01);
(Continued)

(58) Field of Classification Search
CPC ......... B62J 1/06; B62J 1/08; B62J 1/18; B62J 1/20; B62J 1/22; B62J 1/28; B62J 1/02; B63B 2029/043; A47C 7/282; A47C 7/028; A47C 7/0285; A47C 7/32; B60N 2/7011; B60N 2/70; B60N 2/7005; B60N 2/7052
(Continued)

(56) References Cited

U.S. PATENT DOCUMENTS

| 583,433 A | * 5/1897 | Hall ........................... B62J 1/02 297/215 |
| 623,505 A | 4/1899 | Avery |

(Continued)

FOREIGN PATENT DOCUMENTS

| EP | 1118532 | 7/2001 |
| GB | 403195 | 9/1932 |
| JP | 10095376 | 4/1998 |

OTHER PUBLICATIONS

"Harley Hammock Rider and Passenger Touring Seat, Part No. 52000003A" Harley-Davidson, publicly available before Mar. 23, 2017, Retrieved from Internet on Aug. 18, 2017 <URL: http://www.harley-davidson.com/store/hammock-rider-passenger-seat>.

*Primary Examiner* — Kyle J. Walraed-Sullivan
(74) *Attorney, Agent, or Firm* — Michael Best & Friedrich LLP

(57) ABSTRACT

A motorcycle seat assembly that includes a seat pan with a load bearing hammock-type or hammock-style fabric or mesh seat suspension mounted using a suspension mounting bracket to the seat pan that is configured with an integral suspension mounting fixture that enables pre-tensioning of a stretchable webbing of load-bearing fabric or mesh material of the suspension during fixturing and/or mounting of the suspension to the seat pan.

19 Claims, 9 Drawing Sheets

(51) Int. Cl.
*B62J 1/28* (2006.01)
*B62J 1/18* (2006.01)
*B62J 1/08* (2006.01)
*B62J 1/12* (2006.01)
*B60N 2/70* (2006.01)

(52) U.S. Cl.
CPC . *B62J 1/18* (2013.01); *B62J 1/28* (2013.01); *B60N 2/7011* (2013.01)

(58) Field of Classification Search
USPC ............... 297/284.2, 215.11, 215.12, 452.56
See application file for complete search history.

(56) References Cited

U.S. PATENT DOCUMENTS

| | | | |
|---|---|---|---|
| 663,775 A | 12/1900 | McCoy | |
| 975,827 A | 11/1910 | Busch | |
| 1,036,877 A | 8/1912 | Mesinger | |
| 1,045,999 A | 12/1912 | Mesinger | |
| 1,416,942 A | 5/1922 | Brooks | |
| 1,427,484 A | 8/1922 | Lawrence | |
| 1,442,643 A | 1/1923 | Brooks | |
| 1,458,909 A | 6/1923 | Smith | |
| 1,469,227 A | 10/1923 | Lawrence | |
| 2,568,796 A | 9/1951 | Dunlap | |
| 2,667,911 A | 2/1954 | Persons | |
| 3,258,290 A | 6/1966 | Karbin | |
| 3,844,610 A | 10/1974 | Adams | |
| 3,856,348 A | 12/1974 | Bird | |
| 4,062,585 A * | 12/1977 | Herring, Jr. | B62J 1/02 248/634 |
| 4,563,038 A * | 1/1986 | Hirose | B62J 1/12 297/195.12 |
| 4,702,522 A * | 10/1987 | Vail | A47C 7/18 297/284.2 |
| 4,712,834 A * | 12/1987 | Warrick | A47C 7/14 244/122 R |
| 4,858,992 A * | 8/1989 | LaSota | B60N 2/002 297/284.2 |
| 4,869,554 A * | 9/1989 | Abu-Isa | A47C 7/282 297/452.56 |
| 4,910,817 A * | 3/1990 | Kita | B29C 53/36 5/246 |
| 5,044,646 A * | 9/1991 | Iiga | B62J 1/12 180/219 |
| 5,058,952 A * | 10/1991 | LaSota | A47C 7/28 297/284.2 |
| 5,340,192 A | 8/1994 | Hsh | |
| 5,533,783 A * | 7/1996 | Harms | B62J 1/12 180/219 |
| 5,544,937 A * | 8/1996 | Hanagan | B29C 44/12 297/195.12 |
| 5,911,473 A | 6/1999 | Hill | |
| 5,997,088 A * | 12/1999 | Stark | B62J 1/28 297/195.12 |
| 6,010,188 A | 1/2000 | Yates | |
| 6,260,919 B1 | 7/2001 | Yates | |
| 6,578,834 B1 | 6/2003 | Buell | |
| 6,733,084 B2 * | 5/2004 | Butler | A47C 7/282 297/440.22 |
| 7,008,014 B1 * | 3/2006 | Johnson | B62J 1/12 297/195.11 |
| 7,198,129 B2 * | 4/2007 | Sakaki | B62M 7/12 180/219 |
| 7,506,925 B2 * | 3/2009 | Rutherford | B62J 1/00 297/195.1 |
| 7,523,988 B1 * | 4/2009 | Ratza | B60N 2/24 297/230.14 |
| 7,537,280 B2 | 5/2009 | Bleloch | |
| 8,376,455 B2 * | 2/2013 | Inoue | B62J 1/12 180/219 |
| 8,622,472 B2 * | 1/2014 | Rajaratnam | A47C 1/022 297/284.2 |
| 2003/0001424 A1 * | 1/2003 | Mundell | A47C 7/16 297/452.56 |
| 2003/0006640 A1 * | 1/2003 | Yasuda | A47C 1/02 297/452.35 |
| 2003/0193231 A1 * | 10/2003 | Fujita | B60N 2/7094 297/452.56 |
| 2004/0166749 A1 * | 8/2004 | Le Gette | A47C 15/006 441/129 |
| 2005/0006159 A1 * | 1/2005 | Scott | B62J 1/12 180/219 |
| 2006/0055225 A1 * | 3/2006 | Yasuda | B60N 2/58 297/452.18 |
| 2006/0180373 A1 * | 8/2006 | Hanagan | B62J 1/12 180/219 |
| 2006/0279119 A1 * | 12/2006 | Fujita | B60N 2/7094 297/284.2 |
| 2006/0279120 A1 * | 12/2006 | Fujita | B60N 2/502 297/284.2 |
| 2007/0102987 A1 * | 5/2007 | Chen | A47C 7/282 297/452.56 |
| 2007/0236071 A1 * | 10/2007 | Fujita | B60N 2/70 297/452.5 |
| 2008/0048067 A1 * | 2/2008 | Pilgram | B60N 2/7011 244/122 R |
| 2008/0122285 A1 * | 5/2008 | Lin | A47C 7/282 297/452.56 |
| 2009/0308039 A1 | 12/2009 | Marshall et al. | |
| 2009/0309396 A1 | 12/2009 | Arnold et al. | |
| 2011/0115266 A1 * | 5/2011 | Revell | B62J 1/28 297/215.12 |
| 2011/0198909 A1 * | 8/2011 | Fifield | A47C 7/32 297/452.56 |
| 2011/0298269 A1 * | 12/2011 | Mizobata | B60N 2/682 297/452.18 |
| 2012/0013161 A1 * | 1/2012 | Adams | A47C 7/462 297/284.2 |
| 2012/0242122 A1 * | 9/2012 | Kawatani | B62J 1/12 297/214 |
| 2014/0110980 A1 * | 4/2014 | Attey | B62J 1/02 297/215.16 |
| 2015/0108820 A1 * | 4/2015 | Fujita | B60N 2/7011 297/452.48 |
| 2015/0183476 A1 * | 7/2015 | Chiba | B62J 1/12 297/214 |
| 2015/0197298 A1 * | 7/2015 | Sasaki | B62J 1/12 297/215.14 |
| 2016/0176328 A1 * | 6/2016 | Takahashi | B60N 2/70 297/452.21 |
| 2016/0200381 A1 * | 7/2016 | Lorbiecki | B62J 1/14 297/195.12 |
| 2016/0288851 A1 * | 10/2016 | Tada | B62J 1/08 |
| 2016/0332692 A1 * | 11/2016 | Kimber | B62K 25/283 |
| 2017/0021883 A1 * | 1/2017 | Naymark | B62J 1/08 |
| 2017/0259866 A1 * | 9/2017 | Roulund | B62J 1/28 |

* cited by examiner

MOTORCYCLE SEAT ASSEMBLY WITH HAMMOCK-TYPE SUSPENSION

CROSS-REFERENCE TO RELATED APPLICATIONS

The application claims priority to U.S. Provisional Patent Application No. 62/475,687 filed Mar. 23, 2017, the entire contents of which are incorporated by reference herein.

FIELD

The present invention is directed to a vehicle seat and more particularly to a vehicle seat with a hammock-type seat suspension. The present invention is directed to a vehicle seat assembly equipped with a hammock-type beam-spring and mesh seat suspension and more particularly to an improved motorcycle seat assembly that utilizes a hammock-type beam-spring and mesh seat suspension.

INTRODUCTION

U.S. Pat. No. 7,523,988 B1, is directed to a vehicle seat assembly intended for marine use that is equipped with a seat suspension formed of a generally rectangular segment of resilient and stretchable load-bearing webbing made of a flexible load-bearing fabric that typically is a stretchable load-bearing mesh material, e.g., an elastomeric woven mesh, such as a DYMETROL load-bearing fabric or mesh, which is suspended between a pair of spaced apart suspension mounts attached to part of a base of the seat. Before or during assembly to the seat base, the suspension must be manipulated in a manner that increases the tension of the webbing suspended between the seat base attached mounts thereby pre-tensioning the webbing prior to actual suspension use and operation. Pre-tensioning of the webbing must be performed prior to suspension operation in order for the webbing of the suspension to be sufficiently taut, e.g., to be under sufficient tension, and to be generally planar before any load is applied to the suspension during actual use of the suspension in order for the webbing of the suspension to support a load during actual suspension use without the webbing excessively deflecting, deforming or collapsing.

Various arrangements of such a load bearing fabric, e.g., mesh, seat suspension are disclosed in the '988 patent, including one or more that disclose load bearing fabric or mesh webbing extending between a pair of the mounts, where at least one of the mounts is a beam spring that functions as a leaf spring that works in concert with the pre-tensioned webbing suspended between the mounts in supporting loads, resisting deflection, and absorbing bumps, jolts and the like typically encountered by the suspension during suspension operation. In a preferred load-bearing fabric or mesh seat suspension disclosed in the '988 patent, at least one side of the section of suspended pre-tensioned webbing is attached to a J-hook formed with a portion extending outwardly of or from the webbing that has a U-shaped channel or hook, e.g., is a J-shaped hook, which hooks around corresponding one of a plurality of suspension anchors typically integrally formed in or of a base, e.g. seat pan, of the seat.

More recently, a load-bearing fabric or mesh seat suspension similar to that disclosed in the '988 patent has been adapted for motorcycles, such as the load-bearing fabric or mesh suspension provided in Harley-Davidson® "Hammock" seat products (e.g., Harley® Hammock Rider and Passenger Touring Seat Part Number 52000003A), that have a segment of elastomeric DYMETROL load bearing fabric or mesh that is suspended pre-tensioned at opposite ends much like a hammock between a pair of spaced apart suspension mounts that are integrally formed in a three-dimensionally contoured composite and/or plastic pan of a seat base of a motorcycle seat. In order to suspend the segment of webbing of the suspension between the mounts integrally formed, e.g., molded, in the motorcycle seat pan in a manner that also pretensions the webbing with an unloaded tension taut enough to handle the loading, accelerations, bumps, jolts and the like typically encountered by the suspension when supporting a seat occupant, e.g., driver or operator, sitting on the motorcycle seat, a relatively long-handled lever-type suspension mounting tool must be used. During assembly, one side of the webbing is attached to one of the suspension mounts integrally formed in the motorcycle seat pan and the tool manipulated to stretch the webbing enough so that the opposite side of the webbing can be attached to the other one of the suspension mounts integrally formed in the motorcycle seat pan under enough tension, e.g., pre-tension, for the webbing to adequately perform during suspension use during motorcycle operation.

While these motorcycle seats equipped with hammock-type load bearing fabric or mesh suspensions and aforementioned method of assembly have worked well to date, improvements to these hammock-type motorcycle seat suspensions and the method of assembly are nonetheless desirable. As such, what is needed is a motorcycle seat assembly equipped with a hammock-type load-bearing fabric or mesh seat suspension that can more easily be assembled to a pan of a base of a motorcycle seat including in a manner that does so while pretensioning the load-bearing fabric or mesh webbing of the suspension. What also is needed is a motorcycle seat assembly that includes such a hammock-type load-bearing fabric or mesh seat suspension that can be assembled to the seat pan without requiring the use of a lever-action or fulcrum-type tool to pretension the load bearing fabric or mesh webbing of the seat suspension. What further is needed is a motorcycle seat assembly that is equipped with such a hammock-type load-bearing fabric or mesh seat suspension disposed inside the motorcycle seat but which also can accommodate a backrest assembly within the seat that accepts a backrest that is adjustable and preferably also removable from the seat.

The present disclosure is directed to a motorcycle seat assembly with a hammock-type load-bearing fabric or mesh seat suspension that not only provides increased shock isolation and improved seat occupant comfort over conventional motorcycle seats, but which also is more securely anchored to the motorcycle seat pan in a manner that also enables quicker, easier and/or more consistent pre-tensioning of the load-bearing fabric or mesh webbing during suspending the webbing under tension during assembly of the seat suspension to the seat pan. The present disclosure also is directed to a motorcycle seat assembly with an elongate fore-aft longitudinally or dorsally extending seat suspension mounting and support bracket fixed to the pan at a plurality of longitudinally spaced apart locations along the bracket and pan providing a bracket that not only functions as pan-reinforcing backbone of the pan but which also is configured to facilitate pretensioning during assembly and support of the suspension after assembly.

A motorcycle seat base assembly of one exemplary construction is formed of a composite and/or plastic seat pan reinforced by such an elongate longitudinally extending seat suspension mounting and support bracket fixed to the pan where the bracket is configured with a suspension assembly fixture that facilitates pre-assembly attachment of a hammock-type load-bearing fabric or mesh suspension assembly in a manner that permits some suspension component re-positioning or adjustment and which facilitates pretensioning or preloading of the load-bearing fabric or mesh webbing of the suspension assembly by automatically tensioning the webbing during manually fixing of the suspension assembly to the bracket and/or pan during motorcycle seat assembly. In such a preferred motorcycle seat assembly equipped with such a suspension fixturing and assembly facilitating bracket that also serves as a pan-reinforcing backbone of such a motorcycle seat base assembly formed of the bracket and pan, the step of pre-assembling the hammock-type load-bearing fabric or mesh suspension assembly to the fixture locates, orients and arranges the components of the suspension assembly relative to the pan and a seat-occupant supporting saddle of the motorcycle seat, and the step of thereafter fixing the seat suspension assembly to the bracket and/or pan automatically pre-tensions the webbing of the suspension assembly to a desired tension suitable for motorcycle seat suspension operation.

Such a motorcycle seat base formed of such a seat pan reinforced with a backbone provided by such a seat suspension mounting and support bracket extends rearwardly beyond the hammock-type load-bearing fabric or mesh suspension attached to the bracket and/or pan sufficiently for part of the bracket and pan-reinforcing backbone thereof to define a platform upon which a backrest load supporting bracket of a seat backrest assembly can be anchored thereby supporting the backrest assembly thereon enabling such a suspension-equipped motorcycle seat to be equipped with a seat-occupant comfort improving backrest. The use of such a motorcycle seat base assembly formed of a seat pan mounted to a frame or chassis of a motorcycles with vibration isolators disposed therebetween and which is strengthened by a suspension mounting and support bracket of a length greater than needed to fixture and support a hammock-type load-bearing fabric or mesh suspension assembled thereto helps improve seat occupant comfort by reducing vibration transmission from the motorcycle to the seat, better absorbing bumps, jolts, shocks and vibration encountered during movement of the motorcycle during operation, and which provides multiple stages of load deformation resisting suspension operation. Such a hammock-type load-bearing fabric or mesh suspension equipped motorcycle seat advantageously provides increased seat occupant, e.g., operator or driver, comfort which not only improves real-time riding comfort, but which also extends the amount of time during which the seat occupant remains comfortable while riding the motorcycle equipped with the seat.

BRIEF DESCRIPTION OF THE DRAWINGS

One or more exemplary embodiments of the invention are illustrated in the accompanying drawings in which like reference numerals represent like parts throughout and in which.

Figure 1:
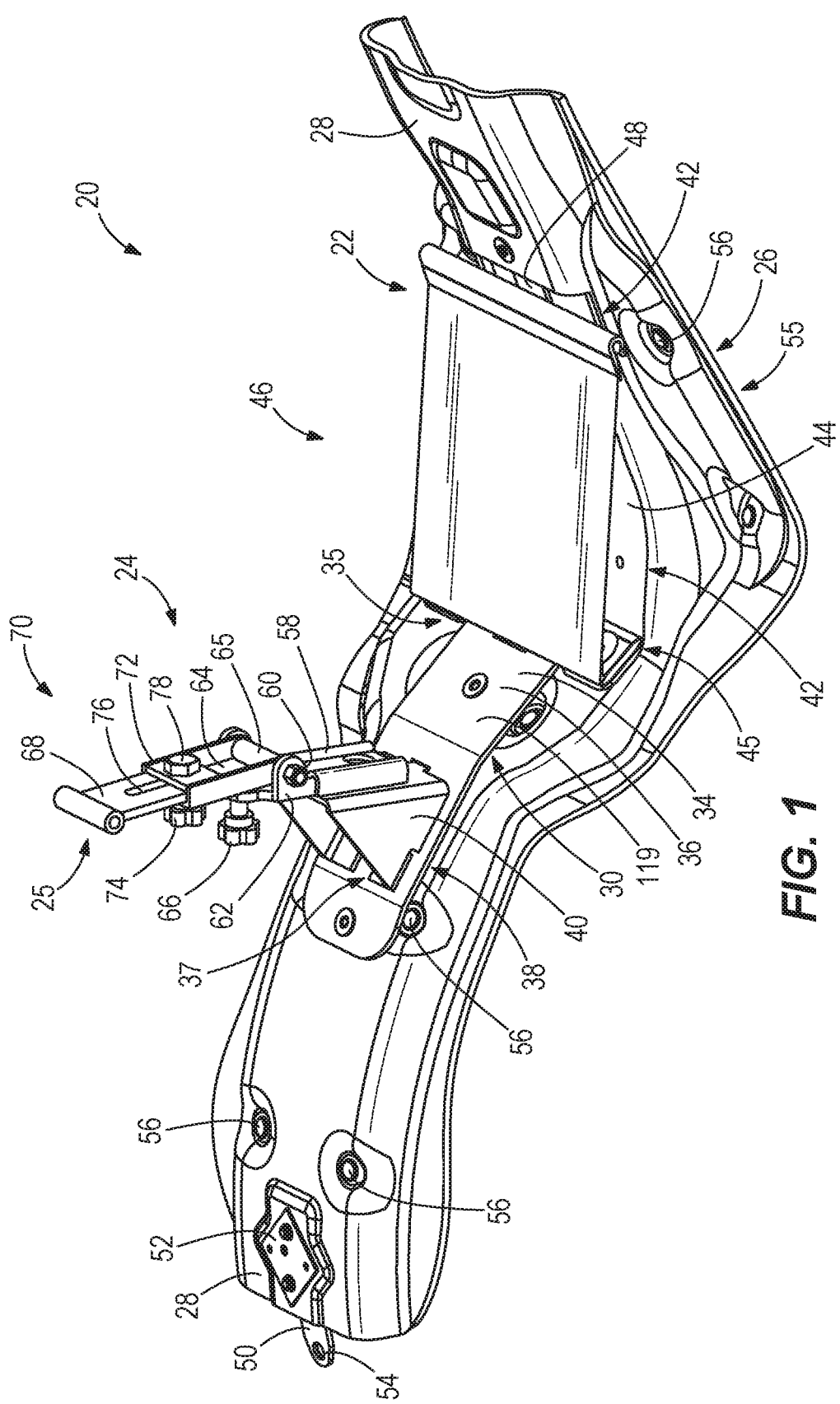
FIG. 1 is a top right side perspective view of a seat pan reinforced with a substantially rigid backbone that also supports and facilitates mounting of a hammock-type suspended fabric seat suspension and adjustable operator backrest to the pan.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-8 illustrate a motorcycle seat assembly 20 that produces a motorcycle seat 32 when assembly is completed that is mountable to a frame or chassis (not shown) of a motorcycle (not shown) with such a motorcycle seat 32 constructed in accordance with the invention equipped with a load-bearing elastomeric fabric or mesh seat suspension 22 and which also can be equipped with a backrest assembly 24 that includes a backrest 25. The seat suspension 22 is arranged so that opposing ends (e.g., fore/aft) are supported, while the mid-section of the fabric or mesh therebetween is unsupported or "suspended". This construction is referred to herein as being of a "hammock-type" since the buttocks of the rider are supported above a seat pan 28 such that a void space exists vertically between the seat suspension 22 and the seat pan 28. The motorcycle seat assembly 20 from which the seat 32 is constructed has a seat base assembly 26 that is formed of an elongate three-dimensionally contoured fore-aft extending composite and/or plastic seat pan 28 mounted to the motorcycle frame or chassis with vibration isolators 56 disposed therebetween and which also has a seat suspension mounting and support bracket 36 attached to the pan 28 that not only anchors the seat suspension 22 to the pan 28 but which also reinforces and/or strengthens the pan 28. The bracket 36 is elongate and extends rearwardly of the seat suspension 22 defining a pan-reinforcing backbone 30 that strengthens and structurally rigidifies the pan 28 producing a more rigid vibration isolating seat base assembly 26 in accordance with another aspect of the invention that reduces, minimizes, or prevents transmission of vibration from the motorcycle frame or chassis to the seat 32 during motorcycle operation.

A seat base assembly 26 of such a motorcycle seat 32 produced from such a motorcycle seat assembly 20 constructed in accordance with the present invention has an elongate suspension mounting and support bracket 36 of multifunction construction that is configured with a seat suspension assembly fixture 42 disposed in a saddle portion 46 of the seat 32 that not only facilitates location, assembly and/or mounting of the seat suspension 22 to the seat base assembly 26, but which also facilitates pretensioning and/or preloading of the suspension 22 during suspension assembly and/or suspension mounting. Such a suspension mounting and support bracket 36 is of multifunction construction having at least a plurality of functions, that can include any combination of functioning as a pan-reinforcing backbone 30 of the seat base assembly 26, a suspension fixture 42 that facilitates location, assembly and/or mounting of the suspension 22 to the seat base assembly 26, and a seat suspension support 35 that supports the seat suspension 22 after location, assembly and/or mounting of the suspension 22 to the seat base assembly 26. Such a multifunction bracket 36 can also have a portion of the backbone 30 extending rearwardly of the suspension 22 that also can be configured for use as a backrest support 37 that includes a backrest mounting platform 38 to which the backrest assembly 24 of a backrest-equipped motorcycle seat 32 is anchored.

Figure 2:
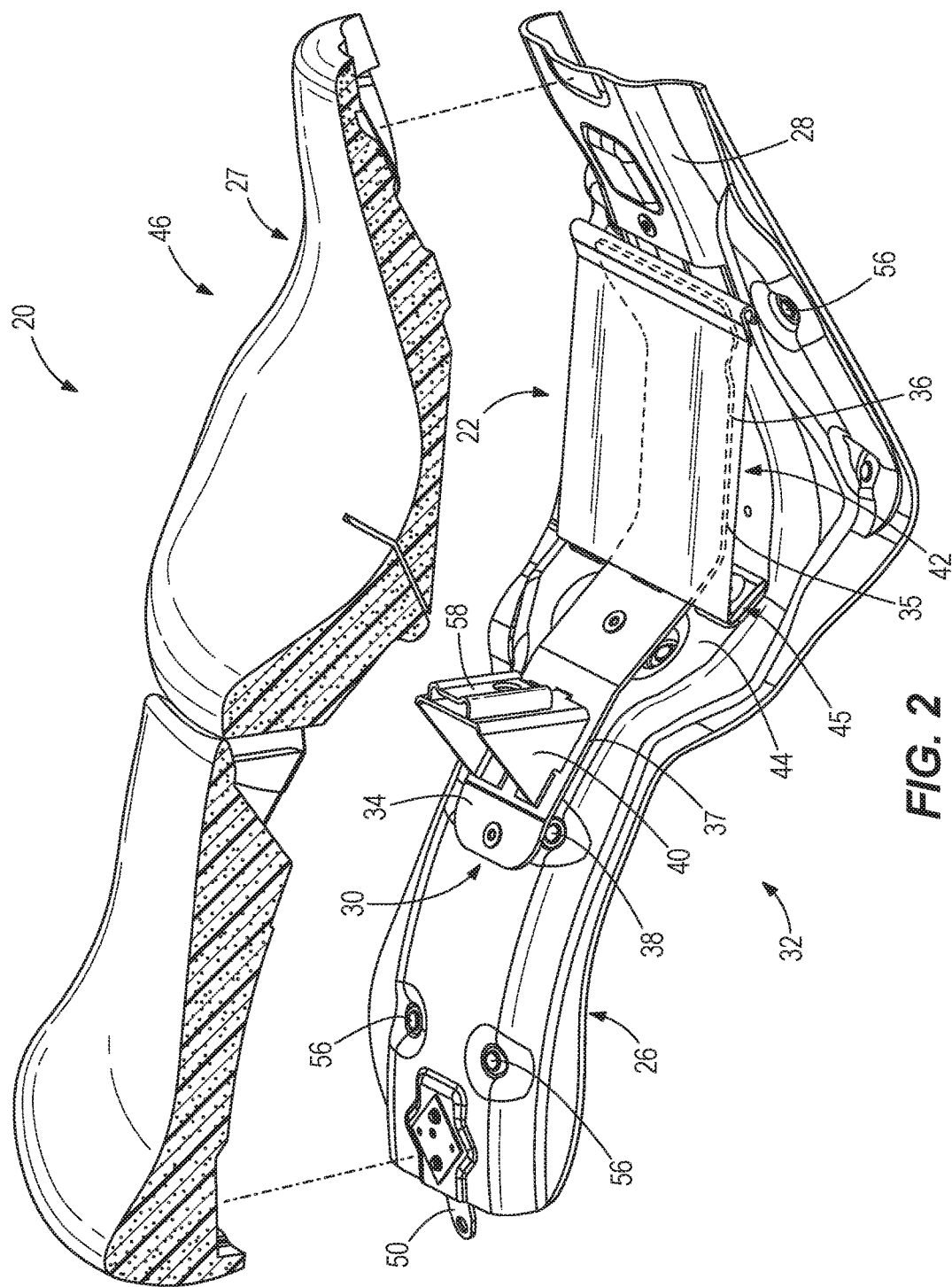
FIG. 2 is a partially exploded view of a motorcycle seat assembly with a foam cushion exploded from a seat base formed of the backbone-reinforced seat pan that includes the hammock-type suspended fabric seat suspension underlying the foam cushion and providing resilient support to an operator on the foam cushion sitting in a saddle of the motorcycle seat.
Figure 3:
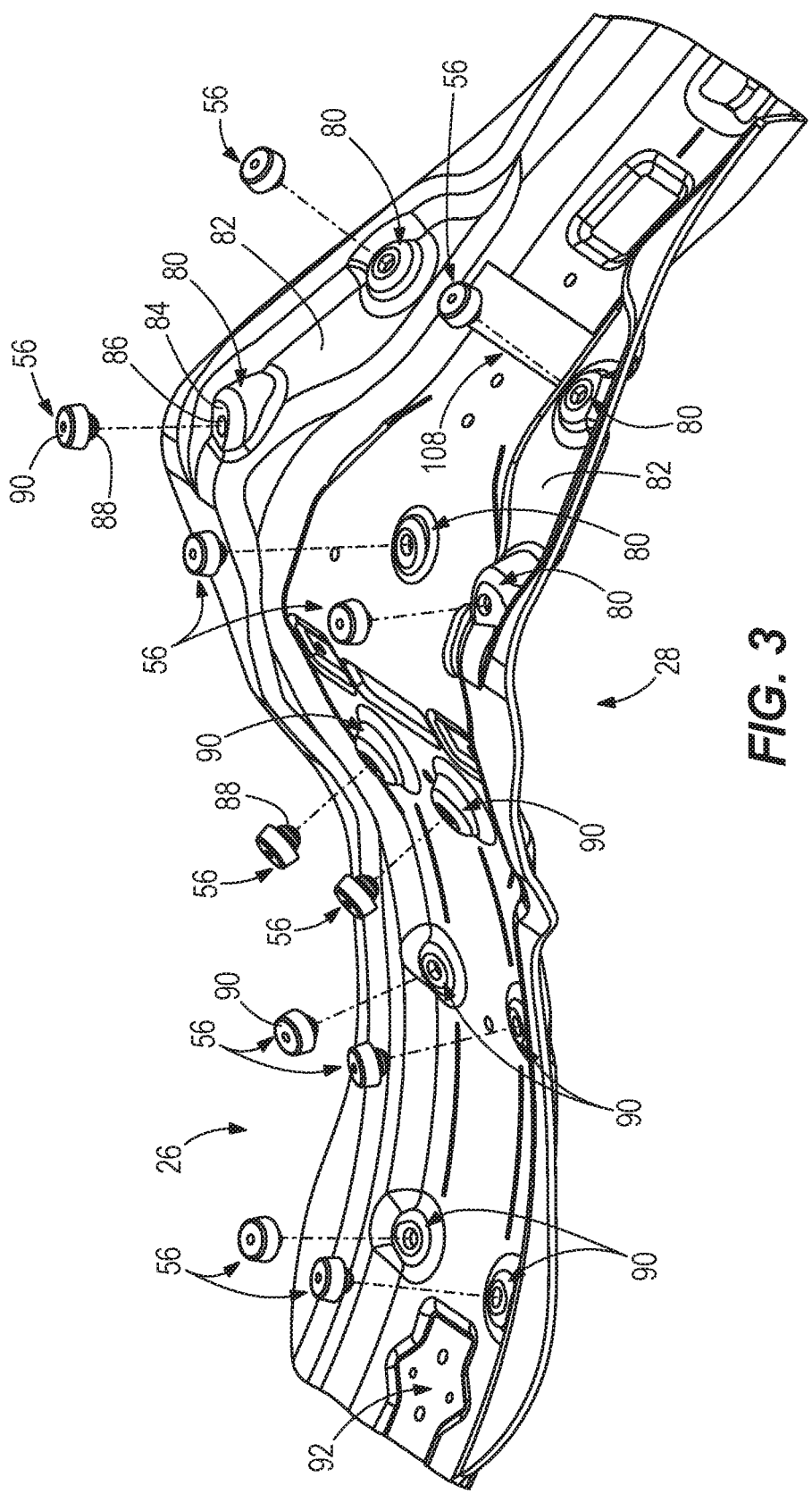
FIG. 3 is a bottom perspective view of the seat pan with vibration isolators disposed between the pan and a chassis or frame of the motorcycle that are exploded from the pan.

As is shown in FIGS. 2 and 3, the seat assembly 20 also includes a seat cushion 27 (e.g., made of an open cell or closed cell foam) carried by the seat base assembly 26 with the seat cushion 27 overlying the seat pan 28 and the seat suspension 22. With continued reference to FIGS. 2 and 3, the seat cushion 27 rests on or against the seat suspension 22 and also rests on or against portion(s) of the seat pan 28 extending forwardly, rearwardly and on opposite sides of the suspension 22. Although not shown in the drawings, a seat cover, such as a cover made of leather, fabric, cloth or another suitable material that can be flexible, resilient, durable, and water-resistant, e.g., water impervious, overlies the cushion 27 and is attached to the base 26, (e.g., by being fixed to the pan 28 such as by using integrally molded seat cover mounting projections, seat cover mounting tangs, fasteners, staples, adhesive(s), or the like).

The motorcycle seat assembly 20 produces a motorcycle seat 32 of relatively strong, durable and vibration dampening construction that provides improved operator or driver comfort and which is mountable to a chassis or frame, e.g., tubular frame, (not shown) of a motorcycle or other vehicle equipped with a plurality of wheels which preferably are spaced apart in a fore-aft direction, at least one wheel of which is driven by a prime mover (not shown), such as an internal combustion engine, electric motor or the like, to cause the vehicle, preferably motorcycle, to move along the ground. The motorcycle seat assembly 20 produces an elongate, oblong longitudinally fore-aft extending motorcycle seat 32 that is mounted longitudinally to the motorcycle in a lengthwise direction relative to the lengthwise extent or longitudinal direction of the motorcycle with a rider, such as an operator or driver, sitting in the saddle 46 of the seat 32 with their legs straddling the seat 32.

The seat suspension mounting and support bracket 36 is elongate, extends in a fore-aft direction along the seat pan 28 with the bracket 36 being generally centrally disposed on or along the pan 28 providing or functioning as an elongate, dorsally extending seat pan reinforcing backbone 30 that also strengthens the pan 28. The bracket 36 is three-dimensionally contoured to complementarily conform to the three-dimensional contour of the pan 28 with the bracket 36 or backbone 30 having a generally concave or U-shaped portion that underlies the seat suspension 22 and which is received in a recessed correspondingly concave or U-shaped saddle portion of the pan 28. Such a bracket 36 that advantageously also strengthens the pan 28 by also serving as a backbone 30 of the pan 28 does so by structurally rigidifying the pan 28 and/or handling loads encountered by the seat suspension 22 and/or backrest 25 during motorcycle operation by transferring and/or spreading out the encountered loads over and/or around the pan 28.

The bracket 36 is configured with a seat suspension support 35 of concave or U-shaped construction that complementarily conforms to the generally concave or U-shape of the saddle portion of the pan 28 underneath the seat suspension 22. Such a generally U-shaped or concave suspension support 35 of the bracket 36 and/or backbone 30 helps spread out the forces encountered by or imposed against the seat suspension 22 while a seat occupant, e.g., rider or operator, is sitting in the saddle of the seat 32 during motorcycle operation that are transmitted to the seat pan 28. Such forces caused by lateral and/or longitudinal accelerations from bumps, jolts, bouncing, and the like encountered by the seat suspension 22 during motorcycle operation are advantageously more uniformly transmitted through the suspension 22 to the backbone 30, i.e., to the bracket 36, and from the backbone 30, i.e., the bracket 36, to the pan 28. Transfer of such forces and other loads encountered by the suspension 22 and seat 20 is facilitated by the pan-reinforcing backbone 30 provided by the bracket 36 preferably is at least in part produced by the bracket 36 and thereby the backbone 30 being formed of a metal, metal alloy, or composite plate 34 having a width $W_{36}$ greater than one-half the narrowest width $W_{28}$ of the pan 28, having a length $L_{36}$ greater than one-half the length $L_{28}$ of the seat pan 28, and having a length $L_{36}$ that is substantially as long as the longitudinal extent of the saddle. This helps improve seat occupant, e.g., operator or driver, comfort by dampening and/or isolating the forces caused by the seat occupant accelerations from such bumps, jolts and the like as a result of vibration isolators 56 being disposed between the pan 28 and motorcycle frame or chassis. The use of elongate seat suspension and support bracket 36 that extends a longitudinal or lengthwise distance along the pan 28 greater than the longitudinal or lengthwise extent of the suspension support 35 not only provides a pan-reinforcing backbone 30 that structurally rigidifies the pan 28, but also spreads the forces from the accelerations caused by such bumps, jolts and the like over an area of the pan 28 greater than the area encompassed by the suspension 22 and suspension support 35 advantageously improving rider feel, comfort and the like.

With specific reference to FIGS. 1, 2, 5 and 6, the bracket 36 serves as a suspension support 35 and extends outwardly beyond the opposite ends of the seat suspension 22 to provide a pan-reinforcing backbone 30 that is elongate, centrally disposed, e.g., dorsally located, and which longitudinally extends greater than one-half the length $L_{28}$ of the seat pan 28 along a longitudinally extending centerline of the seat pan 28 that bisects the seat pan 28 and the backbone 30. As is shown in FIGS. 1-2 and 7-8, the part of the bracket 36 that serves as both the suspension support 35 and corresponding part of the backbone 30 is disposed between the seat pan 28 and the seat suspension 22. As is shown in FIGS. 1-2, the bracket 36 conforms to the shape of the seat pan 28 and rest on or against the seat pan 28 between the seat cushion 27 and seat pan 28.

As best shown in FIGS. 1, 2, 5, 6 and 8, part of the bracket 36 that extends rearwardly of the suspension support 35 is immovably anchored to the pan 28 and forms part of the backbone 30 extending rearwardly of the suspension support 35 that helps reinforce, strengthen, and/or structurally rigidify part of the pan 28. Where the motorcycle seat 32 is equipped with a backrest assembly 24, a portion of the bracket 36 that extends rearwardly of the suspension support 35 and forms part of the backbone 30 includes a backrest mounting platform 38 used to anchor the backrest assembly 24 to the pan 28. As is best shown in FIGS. 1, 2, 5 and 6, the backrest mounting platform 38 provides or defines a backrest assembly support 37 having a generally flat or planar mounting surface on or to which a backrest load supporting bracket 40 of the backrest assembly 24 is fixed thereby anchoring at least the backrest load supporting bracket 40 to the pan 28.

Figure 7:
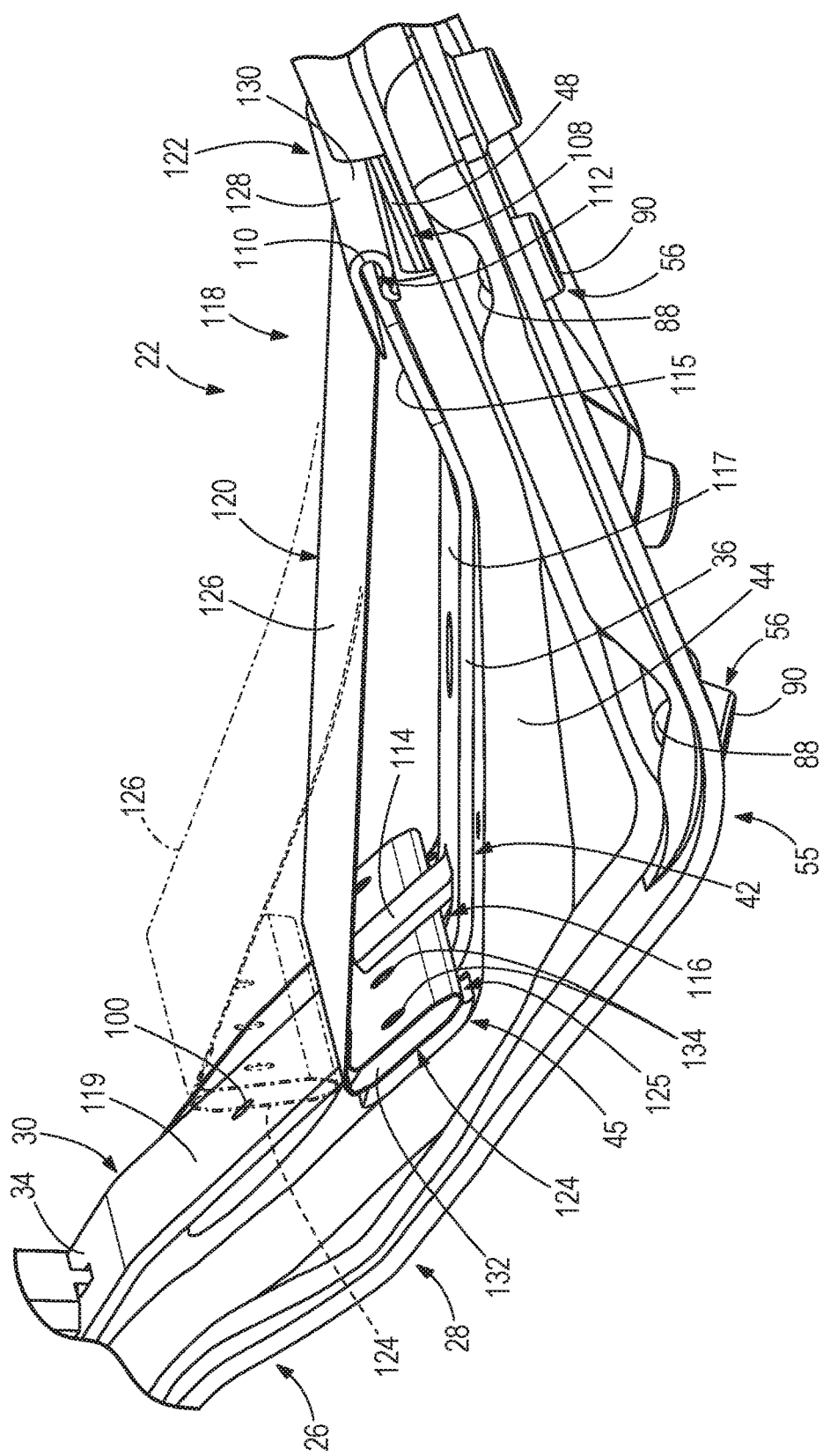
FIG. 7 is a fragmentary perspective view of the backbone-reinforced seat pan with a front end of the hammock-type load bearing fabric seat suspension assembly mounted to front part of an integral suspension mounting fixture provided by part of the backbone and a rear end of the seat suspension assembly being fixtured for mounting and anchoring to the pan and backbone.
Figure 8:
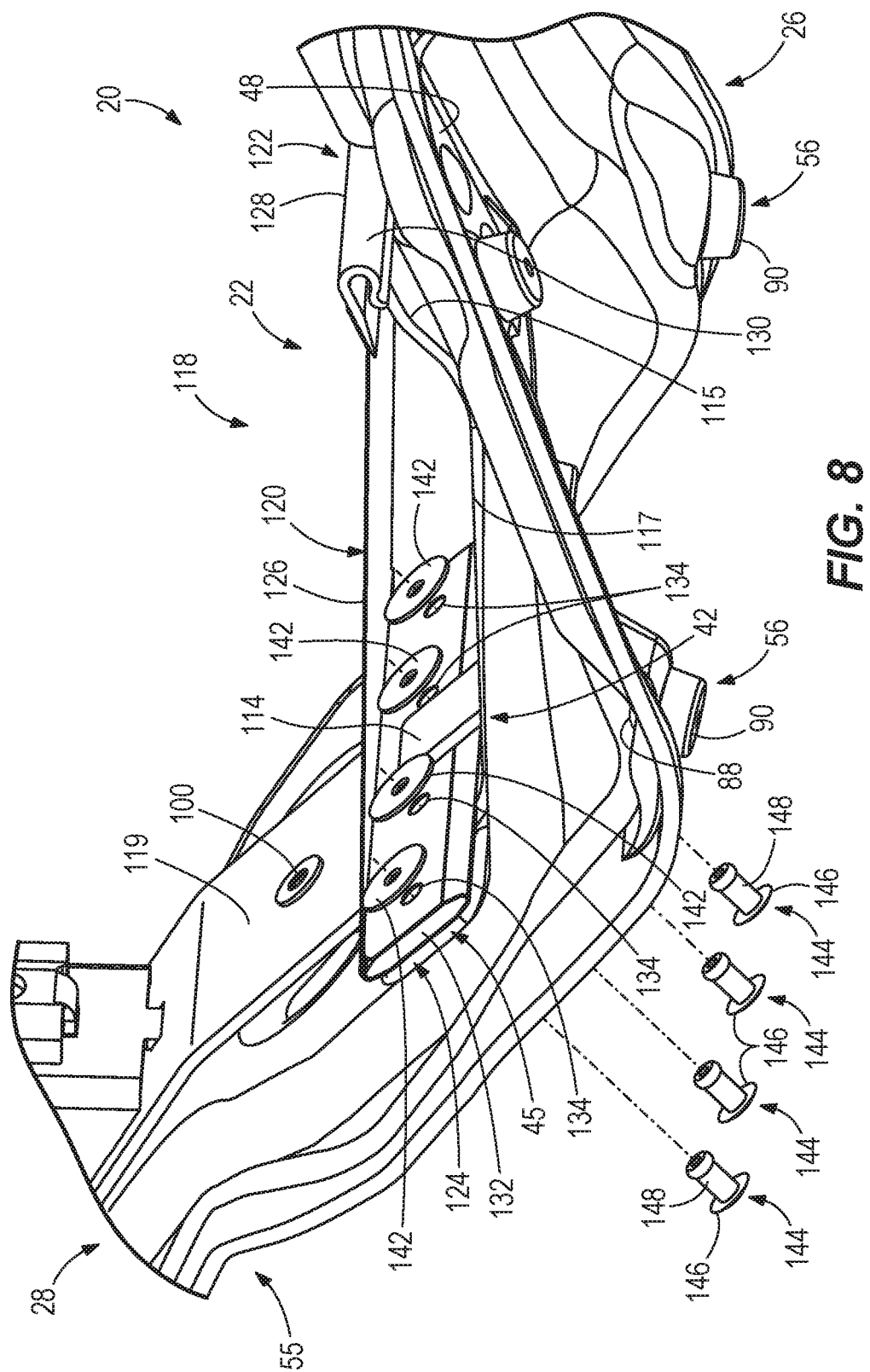
FIG. 8 is a fragmentary perspective of the backbone-reinforced seat pan with the hammock-type load bearing fabric seat suspension assembly mounted to the fixture of the backbone depicting the rear of the seat suspension assembly being substantially immovably anchored to the pan and backbone via fasteners.
Figure 9:
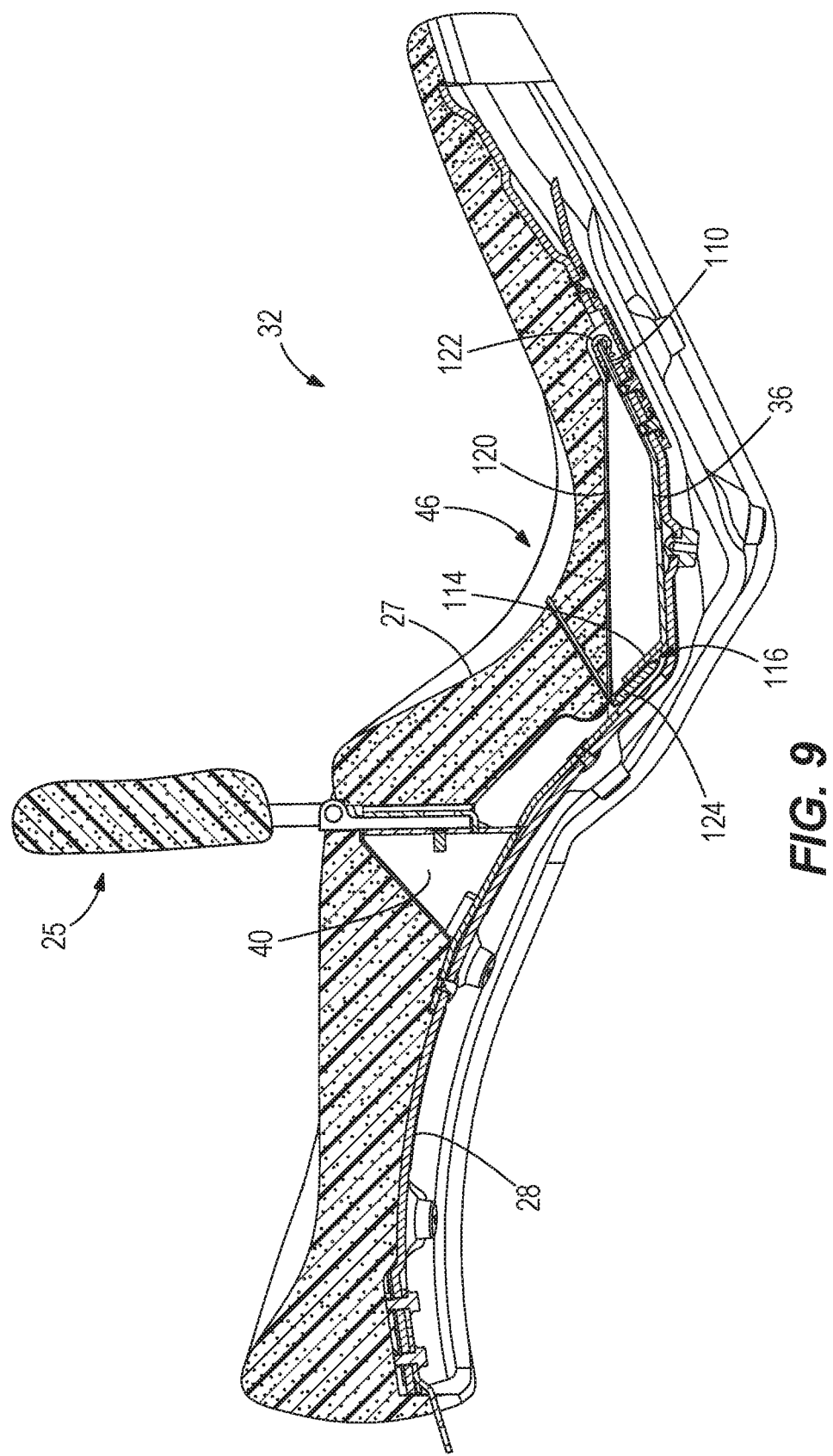
FIG. 9 is a side view of the motorcycle seat assembly of FIG. 2 with the adjustable backrest mounted and the foam cushion, shown in section, assembled to the seat pan over the seat suspension assembly.

The seat suspension mounting and support bracket 36 is formed of an elongate generally rectangular plate 34 that can be of metallic construction, such as made of steel, aluminum or an alloy thereof, which is stamped, shaped, formed, or otherwise plastically deformed having a three-dimensional contour that generally conforms to the three-dimensional contour of the pan 28 and which extends along the pan 28 in a longitudinal fore-aft direction of the pan 28 thereby also providing a pan-reinforcing backbone 30. As disclosed in more detail below, the suspension support 35 of the backbone 30 supports a load-bearing fabric or mesh seat suspension 22 formed when a load-bearing fabric or mesh seat suspension assembly 118 is assembled and mounted during motorcycle seat assembly to the seat base assembly 26 producing an improved comfort motorcycle seat 32 constructed in accordance with the present invention that is equipped with load-bearing elastomeric fabric or mesh seat suspension 22. As is depicted by FIGS. 7-8, the seat suspension assembly 118 is assembled to the bracket 36, namely to the fixture 42 of the bracket 36, and thereafter mounted to the bracket 36, namely to the suspension support 35 of the bracket 36, and a suspension mounting portion of the pan 28. After assembly and mounting of the suspension assembly 118 to the seat base assembly 26 and after completing the rest of the motorcycle seat assembly steps, a motorcycle seat 32 is produced having an internally disposed hammock-type suspended load bearing fabric or mesh seat suspension 22. As shown in FIG. 2, the hammock-type load suspended load bearing fabric seat suspension 22 is internally disposed as it is covered, encompassed or encapsulated within the seat cushion 27, which in turn is internally disposed within an outer seat cover (not shown) covering the seat cushion 27.

As disclosed in more detail below, the bracket 36 is three dimensionally configured to provide at least part of if not substantially the entire suspension fixture 42 to which the seat suspension assembly 118 is fixtured during suspension assembly in preparation for mounting the suspension assembly 118 to the seat base assembly 26. Fixturing the suspension assembly 118 to the fixture 42 prior to mounting or fixing the suspension assembly 118 to the seat base assembly 26 enables pretensioning or preloading of a flexible load-bearing webbing 120 of the suspension assembly 118 during mounting or fixing of the suspension assembly 118 to the seat base assembly 26 without the use of any special or custom tools.

As disclosed in more detail below, structural elements of the fixture 42 of the bracket 36 are configured to enable the seat suspension assembly 118 to be manually engaged therewith as depicted in FIG. 7 thereby properly locating the suspension assembly 118 relative to the saddle 46 of the motorcycle seat 32 so the mounted suspension 22 is disposed in the saddle 46 thereby underlying buttocks of a seat occupant, e.g., driver or operator, sitting in the saddle 46 of the seat 32. As also disclosed in more detail below, part of the fixture 42 can also be and preferably also is provided by part of the pan 28 with the pan 28 preferably having a suspension assembly facilitating clearance slot 108 formed in the pan 28 that forms part of the fixture 42 with the slot 108 underlying and being disposed adjacent to a forwardly located portion of the fixture 42. With continued reference to FIG. 7, the structural elements of the fixture 42 of the bracket 36 releasably retains or holds the suspension assembly 118 in place when assembled to the fixture 42 in a manner that also enables at least some adjustment of a location, position, and/or orientation of part of all of the suspension assembly 118 to be performed before permanently fixing or mounting the suspension assembly 118 to the seat base assembly 26 in the manner depicted in FIG. 8. When fixing or mounting the suspension assembly 118 to the seat base assembly 26 in the manner depicted by FIG. 8, the suspension assembly 118 is fixed or mounted to the bracket 36, for example to the suspension support 35 of the bracket 36. As is also shown in FIG. 8, part of the suspension assembly 118 can also be fixed or mounted to part of the pan 28 adjacent the suspension support 35 of the bracket 36.

The fixture 42 of the bracket 36 is configured to enable assembly of the suspension assembly 118 to the bracket 36 in a manner that locates and fixtures in place the components of the suspension assembly 118 including locating and fixturing in place the webbing 120 of the suspension assembly 118 at a tension less than a greater desired suspension operating tension. The portion of the fixture 42 provided by the suspension assembly clearance slot 108 formed in the pan 28 enables a portion, preferably a forward-most located portion, of the suspension assembly 118 to be assembled to a corresponding adjacent, e.g., forward-most located portion, of the fixture 42 of the bracket 36. The fixture 42 of the bracket 36 is further configured to increase tension of the webbing 120 of the suspension assembly 118 during fixing or mounting the suspension assembly 118 to the seat base assembly 26 making the suspension webbing 120 substantially taut thereby pretensioning or preloading the webbing 120 to a tension or preload that meets or is greater than a desired minimum suspension operating pretension or preload.

After fixturing the suspension assembly 118 to the fixture 42 of the bracket 36 and performing any adjustments to the suspension assembly 118 while fixtured, fixing or mounting the suspension assembly 118 to the seat base assembly 26 is done by fixing or mounting the suspension assembly 118 to the suspension support 35 of the bracket 36 preferably in the manner disclosed in more detail below. When fixed or mounted to the suspension support 35 of bracket 36, the suspension assembly 118 is thereby immovably anchored by the suspension support 35 to the pan 28 in attaching the suspension assembly 118 to the seat base assembly 26.

The suspension support 35 can also include part of the pan 28 to which part of the suspension assembly 118 also is fixed or mounted when fixing or mounting the suspension assembly 118 to the bracket 36. As shown in FIGS. 5-8, where a motorcycle seat assembly 20 constructed in accordance with the present invention is configured so part of the suspension assembly 118 also is fixed or mounted directly to part of the pan 28, the suspension support 35 of the bracket 36 and the part of the pan 28 to which the suspension assembly 118 is fixed or mounted collectively define a suspension mounting arrangement 55 to which the suspension assembly 118 is immovably anchored thereby fixing the suspension assembly 118 to the seat base assembly 26.

With continued reference to FIGS. 5-8, the portion of the suspension fixture 42 of the bracket 36 and any portion of the pan 28 that defines or otherwise provides part of the fixture 42 helps locate and/or position the suspension assembly 118 assembled thereto and fixtured thereby adjacent and/or on the suspension mounting arrangement 55 enabling the suspension assembly 118 to be held by the fixture 42 while being fixed or mounted to the mounting arrangement 55. As disclosed in more detail below, part of the mounting arrangement 55 is formed by part of the bracket 36 and another part of the mounting arrangement 55 is formed by part of the pan 28. As shown in the figures, part of the mounting arrangement 55 is formed by part of the bracket 36 that also forms part of the fixture 42 and another part of the mounting arrangement 55 is formed by another part of the bracket 36 and pan 28 that is disposed adjacent to and underlying another part of the bracket 36 that forms part of the fixture 42 positioning part of the suspension assembly 118 so it overlies and is disposed adjacent the part of the bracket 36 and pan 28 forming part of the mounting arrangement 55 simplifying fixing or mounting thereto.

As shown in the figures, the suspension mounting arrangement 55 is formed of (a) a front suspension mount formed of a forwardly-disposed part of the bracket 36 that also forms part of the suspension fixture 42, and (b) a rear suspension mount that is formed of a rear suspension anchoring part of the bracket 36 that underlies a rearwardly-disposed suspension retaining part of the bracket 36 that forms part of the fixture 42. The rear suspension mount can also include part of the seat pan 28 disposed on either side of the rear suspension anchoring part of the bracket 36 which both underlie the fixturing suspension retainer part of the bracket 36. As shown in FIGS. 5-8, the rear suspension mount of the suspension mounting arrangement 55 can be formed of a rear suspension anchoring part of a rear suspension supporting segment 119 of the bracket 36 that underlies a rear suspension retainer (e.g., retainer tab 114). The retainer tab 114 can be formed as part of the bracket 36 that extends outwardly from the rear bracket segment 119 defining a suspension fixturing pocket 116 therebetween. The rear suspension mount can also include a pair of suspension anchor pads 45 spaced apart by the rear suspension anchoring part of the rear bracket segment 119 that underlies the suspension retainer tab 114.

As disclosed in more detail below, part of the fixture 42 of the bracket 36 that forms part of the suspension mounting arrangement 55 of the bracket 36 also forms part of the suspension support 35 of the bracket 36 because part of the suspension assembly 118 is permanently immovably anchored thereto when the steps of (1) assembling the suspension assembly 118 to the fixture 42, (2) fixturing the suspension assembly 118 by locating or positioning the suspension assembly 118 as needed relative to the mounting arrangement 55, and (3) thereafter fixing the suspension assembly 118 to the mounting arrangement 55 are sequentially performed to equip motorcycle seat assembly 20 of the present invention with a comfort-improving and fatigue-preventing load-bearing fabric or mesh seat suspension 22. When the suspension assembly 118 has been assembled to the fixture 42, part of the suspension assembly 118, preferably the front part of the suspension assembly 118, is assembled to a forwardly-disposed part of the bracket 36, namely suspension fixturing and mounting retainer 110, which not only is part of the fixture 42, which holds the front part of the assembly 118 in place in a desired location and/or orientation, but also is part of the mounting arrangement 55, namely front suspension mount, to which the front part of the suspension assembly 118 becomes permanently immovably fixed or mounted when suspension assembly and mounting is finished. Since this same forwardly-disposed part of the bracket 36, namely suspension fixturing and mounting retainer 110, is used to fixture the front part of the suspension assembly 118 and is part of the suspension mounting arrangement 55, namely is the front suspension mount, this same forwardly-disposed part of the bracket 36, namely suspension retainer 110, also forms part of the suspension support 35 after the suspension assembly 118 has been fixed to the seat base assembly 26.

The seat base assembly 26 of the motorcycle seat assembly 20 used to produce the motorcycle seat 32 advantageously is a suspension fixturing and anchoring motorcycle seat base assembly 26 constructed in accordance with at least one aspect the present invention that is configured with a suspension fixturing, pretensioning, mounting and supporting bracket 36 mounted to a seat pan 28 that also is reinforced by the bracket 36. Such a seat base assembly 26 formed of a seat pan 28 to which such a suspension fixturing, suspension pretensioning, suspension mounting, and suspension supporting bracket 36 is fixed advantageously facilitates assembly, fixturing, pretensioning, mounting and subsequent continued support of the seat suspension 22 as it is configured to enable and facilitate assembly, fixturing and mounting the suspension assembly 118 to the seat base assembly 26 without the need or use of any special tools to do so.

With specific reference to FIGS. 1-3, the seat pan 28 is constructed of high density polyethylene (HDPE) that is vacuum molded to impart a desired oblong, three-dimensional elongate shape to the pan 28. The seat pan 28 has a concave or recessed operator-supporting section 44 disposed adjacent a fore or front end of the pan 28 that underlies a rider or operator supporting saddle 46 of the seat 32 equipped with a load-bearing fabric or mesh suspension equipped motorcycle seat assembly 20. The fore or front end of the pan 28 preferably is configured to facilitate attachment to the motorcycle chassis or frame having an elongate front seat mounting tongue 48 (FIG. 1) anchored at or adjacent one end to the pan 28 and extends longitudinally along the longitudinally extending centerline of the pan 28 underneath the pan 28 toward the fore or front end of the pan 28 where an opposite end of the tongue 48 preferably is slidably telescopically received in a mounting socket or tube (not shown) of the motorcycle chassis or frame.

The rear or aft end of the pan 28 also is configured for attachment to the chassis or frame of the motorcycle via an elongate, longitudinally extending, and centrally disposed rear seat mounting bracket 50. As best shown in FIG. 1, the rear seat mounting bracket 50 is fixed to the pan 28 at or adjacent one end of the pan 28 by a seat mounting bracket anchor plate 52, e.g., a diamond-shaped mounting plate, and extends outwardly from the rear or aft end of the pan 28 where an opposite end of the rear seat mounting bracket 50 is attached via a fastener, e.g., mounting bolt, or the like (not shown) to the motorcycle chassis or frame. To help improve rider comfort, there is at least a plurality of pairs, e.g., at least three pairs, of isolators 56 of elastomeric construction, e.g., rubber dampers or bushings, disposed between the seat pan 28 and motorcycle chassis or frame. When the seat suspension mounting and support bracket 36 is attached to the pan 28 and the pan 28 carrying the bracket 36 is mounted to the motorcycle chassis or frame with the vibration isolators 56 sandwiched between the pan 28 and motorcycle chassis or frame, the pan 28, bracket 36 with pan-reinforcing backbone 30, and vibration isolators 56 form a more rigid vibration dampening seat base assembly 26 that better supports a rider or operator sitting in the seat saddle 46 and better isolates the rider or operator from road-induced and chassis vibration all of which advantageously improve rider or operator comfort and reduce fatigue.

With reference once again to FIG. 1, the backrest assembly 40 has a backrest load supporting bracket 40 that is fixed to the backrest mounting platform 38 of the backrest assembly support 37 of bracket 36 and/or backbone 30 thereby anchoring the backrest assembly 24 to the seat pan 28. The backrest load supporting bracket 40 carries a backrest receptacle 58 in which an elongate post 60 of a backrest adjustment bracket 62 is received. An upwardly extending backrest adjuster bracket 64 is attached at or adjacent one end via a pivot 65 to the backrest adjustment bracket 62 in a manner that enables a fore-aft angle of inclination of the backrest 25 about the pivot 65 to be adjusted. A backrest angle adjustment control 66 carried by the backrest adjustment bracket 62 is manipulable, such as by a seat occupant and/or operator of the motorcycle, to change the angle of the backrest 25 relative to vertical in a fore-aft direction.

With continued reference to FIG. 1, the backrest adjuster bracket 64 is slidably and position-adjustably attached at or adjacent an opposite end to a backrest height adjustment bracket 68 by a manipulable backrest height adjustment position retainer arrangement 70. As shown, the backrest height adjustment position retainer arrangement 70 has a generally rectangular backrest height clamping plate 72 on one side of the backrest height adjustment bracket 68 and the adjuster bracket 64 and a manipulable backrest height position locking control 74 on the other side of the backrest height adjustment bracket 68 and the backrest adjuster bracket 64 that is manipulable, such as by a seat occupant and/or operator of the motorcycle, to fix the height of the backrest 25 by frictionally clamping the plate 72, backrest height adjustment bracket 68, and the backrest adjuster bracket 64 together.

The backrest height adjustment bracket 68 is elongate, rectangular and has a longitudinally extending slot 76 through which a stem (not shown), such as a threaded stem, of the backrest height position locking control 74 extends until it threadably engages the backrest height position locking clamping plate 72 and/or a backrest height position locking clamping nut 78 disposed exteriorly of the clamping plate 72. The backrest height position locking control 74 is or includes a knob in some constructions that is manually rotated in one direction to clamp the backrest height adjustment bracket 68 between the clamping plate 72 and backrest adjuster bracket 64 setting the height of the backrest 25 by frictionally locking the backrest height adjustment bracket 68 in place. When the knob of the backrest height position locking control 74 is rotated in an opposite direction, the backrest height adjustment bracket 68 is unclamped allowing the bracket 68 to be slidably moved up or down to change the height of the backrest 25. As the backrest 25 is moved up or down, the stem of the knob of the backrest height position locking control 74 rides along the slot in the backrest height adjustment bracket 68. When a desired height of the backrest 25 is reached or otherwise achieved, the knob of the control 74 is rotated in the direction that substantially immovably clamps the backrest 25 in place setting the height of the backrest 25.

FIGS. 3-8 illustrate the motorcycle seat assembly 20 and method of making the motorcycle seat assembly 20 to produce a motorcycle seat 32 that is equipped with a load-bearing fabric or mesh seat suspension 22 anchored to the seat pan 28 by a seat suspension mounting and support bracket 36 that also functions as a pan-reinforcing backbone 30 to a three-dimensionally contoured or configured part of the pan 28. The bracket 36 is configured, e.g., by being three-dimensionally formed, to not only define at least part of a fixture 42 that facilitates assembly and fixturing of the suspension assembly 118 in mounting the suspension assembly 118 to the seat base assembly 26, but also is configured, e.g., by being three-dimensionally formed, to define at least part of a suspension support 35 that supports the seat suspension 22 after assembly, fixturing and mounting of the suspension assembly 118 is completed.

The bracket 36 is formed of a relatively wide, strong, rigid elongate metal or metal alloy plate 34. The bracket 36 may have a width $W_{36}$ greater than one-half the narrowest width $W_{28}$ of the seat pan 28 and a length $L_{36}$ greater than one-half the length $L_{28}$ of the seat pan 28 providing a pan-reinforcing backbone 30 anchored to the pan 28 over at least half the length $L_{28}$ of the seat pan 28 thereby reinforcing, stiffening and strengthening the seat pan 28 over at least half the length $L_{28}$ of the seat pan 28. Such a bracket 36 that provides such a pan-reinforcing backbone 30 not only reinforces, structurally rigidifies and strengthens the pan 28, but the length of the pan-reinforcing backbone 30 provided by the bracket 36 also advantageously more uniformly spreads out forces over a greater area of the pan 28 that are experienced by the seat suspension 22 and transmitted by the bracket 36 to the pan 28 during motorcycle operation, including due to the loading of the seat suspension 22 by the seat occupant, e.g., rider or operator, sitting in the saddle 46 of the seat 32. By the bracket 36 spreading out such forces encountered by the suspension 22 over a greater area of the pan 28, such a seat base assembly 26 formed of the pan 28 and bracket 36 anchored thereto advantageously reduces, minimizes, or completely prevents deflection and/or deformation of the pan 28 during motorcycle operation to produce a more stable and secure seat 32 which in turn helps improve comfort and reduce fatigue. Such a backbone 30 provided by the bracket 36 not only reinforces the seat pan 28, but can be configured, e.g., by being three-dimensionally formed, to provide not just a suspension mounting platform, but which also can be further configured, e.g., by being further three-dimensionally formed, to provide another platform 38 to which backrest assembly 24 can be and preferably is mounted.

Such a seat pan 28 with such a mounting bracket 36 fixed thereto having a width $W_{36}$ greater than one-half the narrowest width $W_{28}$ of the seat pan 28 and a length $L_{36}$ greater than one-half the length $L_{28}$ of the seat pan 28 helps reinforce and structurally stiffen at least half of the seat pan 28, at least the portion of the seat pan 28 underlying or forming part of the saddle 46 of the seat 32, thereby forming a stronger, more rigid, and more supportive seat base assembly 26 that produces a stronger, more supportive and more comfortable seat 32. In addition, such a stronger, more rigid, and more supportive seat base assembly 26 can also include a vibration dampening motorcycle seat mounting arrangement as described in more detail below and shown in FIGS. 3-4 that not only reduces transmission of vibration and noise from the motorcycle to the seat 32, but which also helps reduce the magnitude of forces on the suspension 22 from bumps, jolts, shocks and the like encountered by the motorcycle when being driven.

FIG. 3 illustrates an initial motorcycle seat assembly step where a plurality of pairs, i.e., at least three, vibration dampening and isolating elastomeric isolators 56 are each mounted in a respective recessed vibration isolator mounting seat 80 formed in an underside 82 of the seat pan 28. Each vibration isolator seat 80 includes a flat vibration isolator support land 84 with an opening 86 therethrough that receives a mounting or retainer portion of a corresponding vibration isolator 56 seated in the seat 80, thus attaching the isolator 56 to the pan 28. In some constructions, each vibration isolator 56 is made of an elastomer or elastomeric material, such as a natural rubber, synthetic rubber. Each vibration isolator 56 can have a generally cylindrical vibration dampening and/or isolating body 90 from which a narrower or diametrically smaller, e.g., necked down, generally cylindrical mounting stem 88 outwardly extends. In assembly, the isolator mounting stem 88 is inserted through the opening 86 of a corresponding isolator mounting seat 80 until a radially outwardly extending portion, e.g., shoulder, of the isolator body 90 bears against or otherwise contacts the isolator support land 84 positioning the body 90 of each isolator 56 between the seat pan 28 and a portion of the chassis or frame of the motorcycle, reducing or preventing direct contact therebetween during motorcycle use and operation. When assembly of the vibration isolators 56 to the seat pan 28 is completed, the vibration isolators 56 form part of a mounting arrangement, preferably a vibration dampening mounting arrangement, used in mounting the seat 32 to a frame or chassis of a motorcycle that advantageously is vibration dampening and/or shock absorbing.

Figure 4:
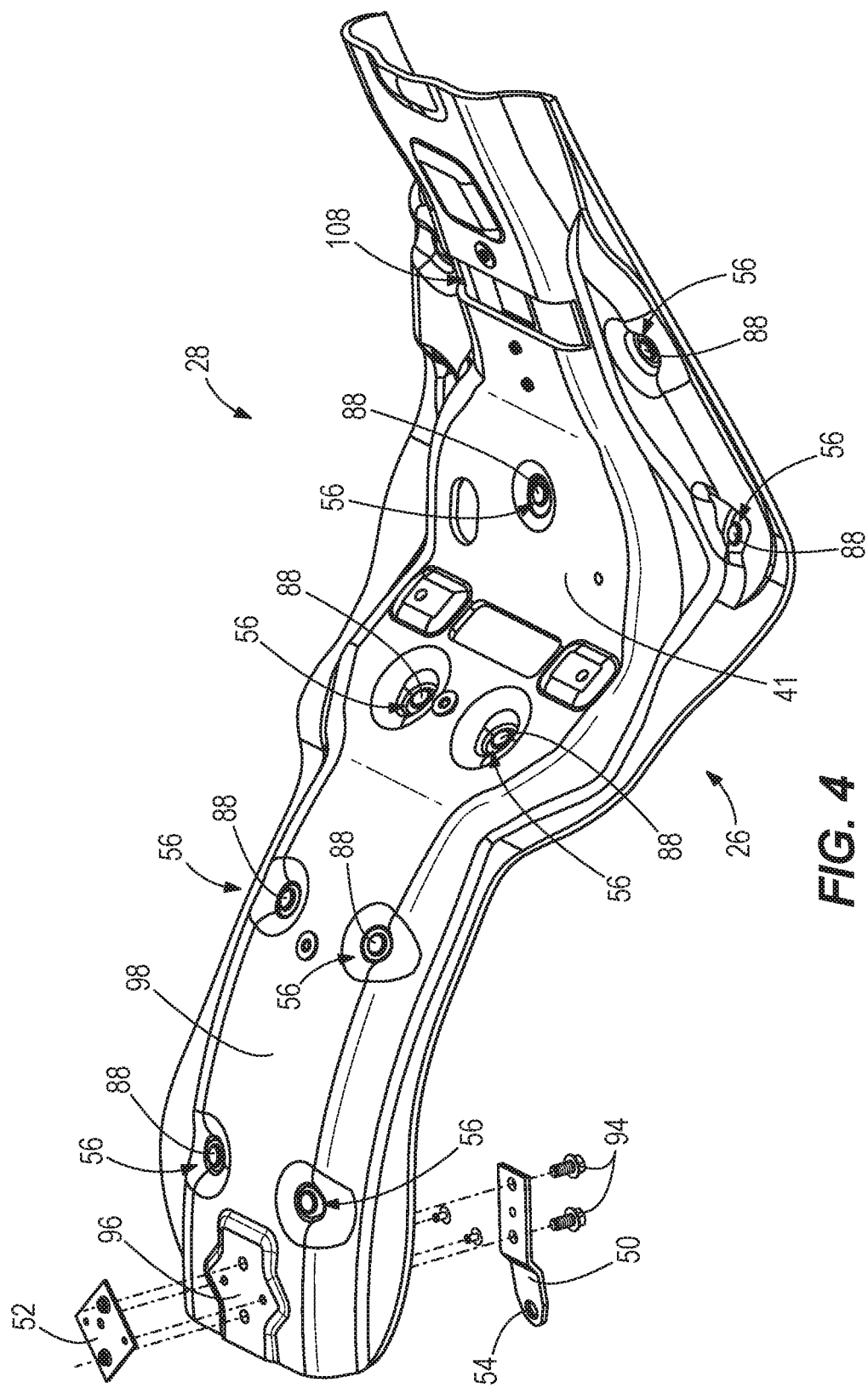
FIG. 4 is a top perspective view of the seat pan with a rear seat pan mounting assembly exploded from the pan.

With additional reference to FIG. 4, in another assembly step, the rear seat mounting bracket 50 is received in a recessed elongate mounting bracket anchoring well 92 (FIG. 3) formed in the bottom surface 82 of the seat pan 28 and the bracket 50 is anchored by fasteners 94 to the generally diamond-shaped seat mounting bracket anchor plate 52 that abuts against a flat anchor plate land 96 formed in an outer or top surface 98 of the seat pan 28. When attachment of the rear seat mounting bracket 50 is finished, the bracket 50 is disposed on one side 82 of the seat pan 28 and the anchor plate 52 is disposed on an opposite side 98 of the seat pan 28 with the seat pan 28 sandwiched between the bracket 50 and plate 52.

Figure 5:
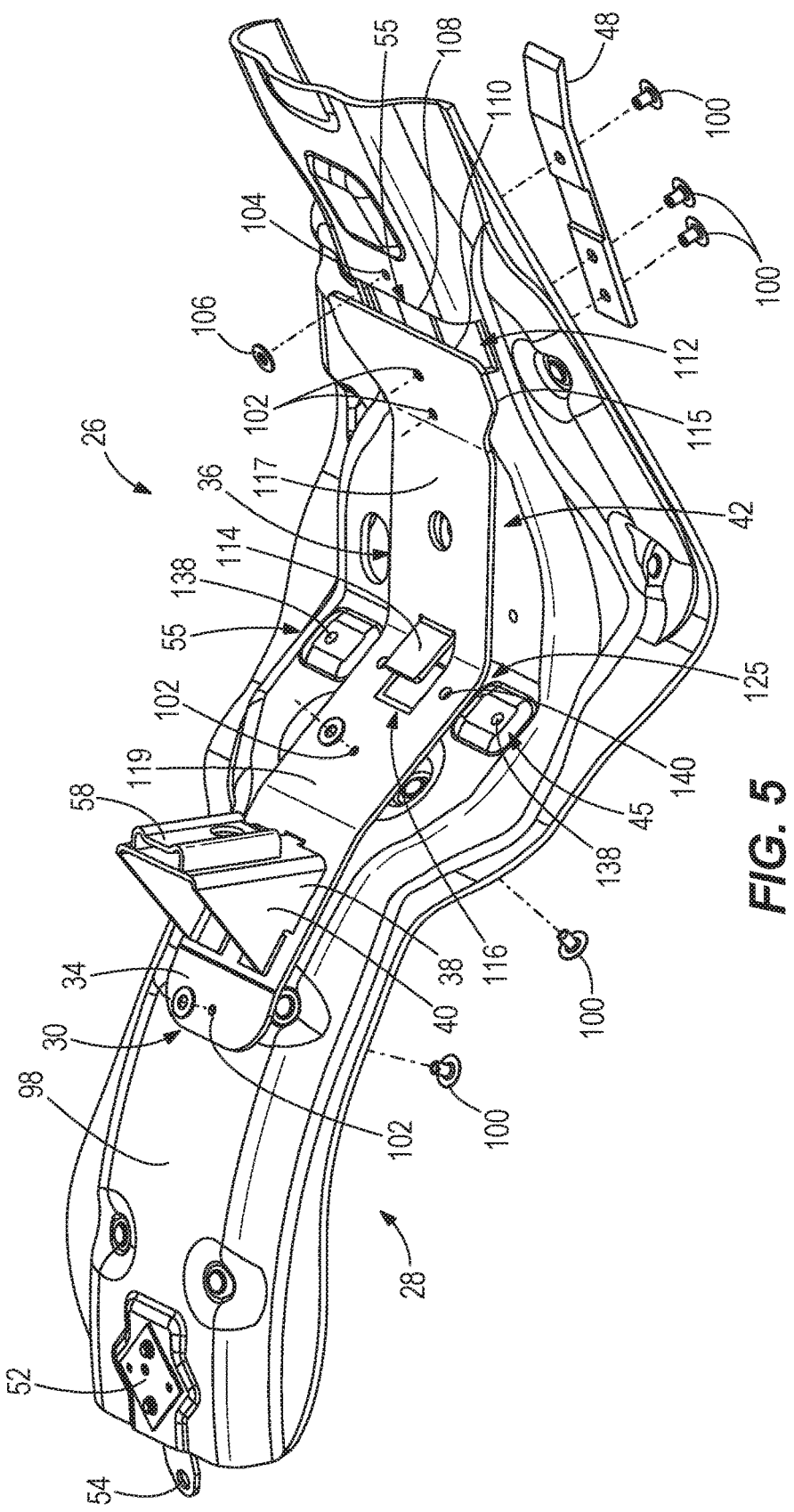
FIG. 5 is a top perspective view of the seat pan with the pan-reinforcing backbone attached and supporting part of an adjustable backrest assembly anchored to the backbone.

With additional reference to FIGS. 5-9, in still another assembly step, the seat suspension mounting and support bracket 36 is formed of an elongate flat plate 34 that rests against the outer or top surface 98 of the seat pan 28 with the bracket 36 three-dimensionally formed to complementarily match the three-dimensional contour of the concave saddle-underlying portion of the seat pan 28 extending rearwardly thereof toward and onto a rider or passenger portion of the seat pan 28. As is best shown in FIG. 5, the bracket 36 is mounted to the seat pan 28 using a plurality of backbone-anchoring fasteners 100 that are longitudinally spaced apart along the length of the bracket 36 and the pan-reinforcing backbone 30 provided by the bracket 36. At least three fasteners 100 are provided in some constructions, e.g., four as shown. In some constructions, all of the backbone-anchoring fasteners 100 are rivets, but can be another type of fastener if desired, e.g., a threadably engaging fastener such as a screw, bolt, or the like. As discussed in more detail below, each one of the fasteners 100 used to attach the bracket 36 to the seat pan 28 extends through the seat pan 28 and engages part of the bracket 36. If desired, one or more of the fasteners 100 can extend through the seat pan 28, through the bracket 36, and threadably engage a retainer (not shown), such as a nut, e.g., threaded nut, washer, anchor plate, or the like, exteriorly disposed against the bracket 36 to mount the bracket 36 to the seat pan 28. With reference to FIG. 5, each one of the fasteners 100 extends through a bore in the seat pan 28 and either (a) directly engages a corresponding bore 102 formed in the bracket 36 that can extend all the way through the bracket 36, or (b) extends through the bore 102 and engages a separate retainer, such as a nut, e.g., threaded nut, washer, anchor plate or the like to attach the bracket 36 to the seat pan 28.

With continued reference to FIG. 5, one of the backbone-anchoring fasteners 100 extends through a bore through the pan 28 and into or through bore 102 in the backbone 30 of the bracket 36 adjacent a rear end of the backbone 30 that is located rearwardly of the backrest mounting platform 38, thereby anchoring one end of the backbone 30 to the seat pan 28. A second one of the fasteners 100 extends through another bore through the seat pan 28 and/or bore 102 in backbone 30 between the backrest mounting platform 38 and the suspension support 35 part of the bracket 36 of which the backbone 30 is formed thereby anchoring an intermediate portion of the backbone 30 (and bracket 36) to the seat pan 28 that is located between the backrest mounting platform 38 and the suspension support 35. A plurality of the fasteners 100 extend respectively through a pair of longitudinally spaced apart bores in the seat pan 28 and/or bores 102 in backbone 30 (and bracket 36) adjacent a front end of the backbone 30 (and bracket 36) not only anchoring a front portion of the backbone 30 (and bracket 36) to the seat pan 28 but also mounting the front seat mounting tongue 48 thereto. The front seat mounting tongue 48 also is directly anchored to the pan 28 by another fastener 100 disposed forwardly of the backbone 30 (and bracket 36), as also shown in FIG. 5, which extends from one side of the seat pan 28 through a bore 104 in the seat pan 28 and which can engage with a retainer 106 that can be or can include a nut, washer, anchor plate or the like disposed on an opposite of the seat pan 28.

With continued reference to FIG. 5, a transversely extending suspension clearance slot 108 is formed in the seat pan 28 adjacent a front end of the seat pan 28 that underlies a generally straight, elongate and transversely oriented front suspension fixturing and mounting retainer 110 of a forwardly disposed generally planar suspension fixturing and mounting tongue 115 of the bracket 36 that forms part of both the suspension fixture 42 and the suspension support 35. As is best shown in FIGS. 5-8, the front suspension retainer 110 is formed of a transversely extending elongate outer or front edge of the tongue 115 that defines a front suspension anchor 112 which is the part of the suspension retainer 110 that is engaged by, e.g., hooked by, a front portion of the seat suspension assembly 118 during assembly and fixturing of the suspension assembly 118. The suspension mounting tongue 115 is upwardly inclined and extends outwardly from an intermediate suspension supporting segment 117 (e.g., a generally planar, generally horizontally extending segment) of the bracket 36 that forms part of the suspension mounting arrangement 55 and suspension support 35 of the bracket 36. In addition to the intermediate bracket segment 117 forming a base of the suspension support 35 and mounting arrangement 55, intermediate bracket segment 117 also forms part of the backbone 30 extending along at least part of a bottom-most portion of a generally concave suspension-supporting and/or operator underlying section 44 of the seat pan 28 that underlies and/or forms part of the saddle 46 of the seat 32 when seat assembly is completed. As is best shown in FIGS. 7-8, the forwardly disposed suspension mounting tongue 115 extends outwardly in one direction from the intermediate bracket segment 117 and is inclined upwardly relative to the intermediate bracket segment 117 forming an obtuse included angle with the tongue 115. Extending outwardly from the intermediate bracket segment 117 in a direction opposite the tongue 115 is the rear suspension fixturing and mounting bracket segment 119 that also is inclined upwardly relative to the intermediate bracket segment 117 also forming an obtuse included angle therewith. As is best shown in FIGS. 7-8, the tongue 115, intermediate bracket segment 117, and rear bracket segment 119 collectively form a generally U-shaped suspension support 35 which supports the suspension 22 when assembly and mounting of the seat suspension assembly 118 thereto is completed. As is also shown in FIGS. 7-8, the bracket segments 115, 117 and 119 that form the suspension support 35 of the bracket 36 also complementarily match or conform to a generally U-shaped concave suspension-supporting and/or operator underlying section 44 of the pan 28.

With reference to FIGS. 5-8, the rear suspension fixturing and mounting bracket segment 119 has a rear suspension retainer tab 114 that is part of the suspension fixture 42 that is upraised from the rest of the rear bracket segment 119 defining a suspension fixturing pocket 116 that releasably retains part of the rear of the suspension assembly 118, e.g., a rear suspension mounting beam 132 of the suspension assembly 118, in the pocket 116 during assembly and fixturing of the suspension assembly 118. As is best shown in FIG. 7, the suspension retainer tab 114 also provides a suspension assembly guide that guides and helps facilitate insertion of the suspension mounting beam 132 into the pocket 116 during assembly of the suspension assembly 118 to the fixture 42. After assembly, the mounting beam 132 is releasably retained in the pocket 116 and fixtured by the tab 114 of fixture 42 so the beam 132 maintains a desired relative location and spacing from a rear portion of the suspension mounting arrangement 55 readying the beam 132 to be fixed or immovably mounted thereto in a subsequent rear suspension assembly fixing or mounting step.

As disclosed in more detail below, the webbing 120 is under an initial lesser fixtured amount of tension when the beam 132 is inserted into the pocket 116 and fixtured in a desired location and spacing from the rear portion of the suspension mounting arrangement 55 formed by rear suspension anchor pads 45 and adjacent portion of the rear suspension fixturing and mounting bracket segment 119 disposed between the pads 45. During a subsequent fixing or mounting step, the beam 132 is manually urged toward, adjacent to, and/or against pads 45 and/or the portion of the rear bracket segment 119 extending between the pads 45 while fixtured in the pocket 116 by the tab 114, increasing the tension of the webbing 120 to a tension greater than the initial fixtured amount of tension, thereby further preloading or pre-tensioning the webbing 120. The beam 132 is then fixed or mounted to at least one of the anchor pads 45 (e.g., a plurality of anchor pads 45) and/or a portion of the rear bracket segment 119 disposed between the pads 45 thereby setting the final tension of the preload or pre-tension of the webbing 120 to an amount of tension greater than the initial fixtured amount of tension so the webbing 120 has a pre-tension or preload tension greater than a minimum suspension operating tension and/or which falls within a desired suspension operating tension range.

Figure 6:
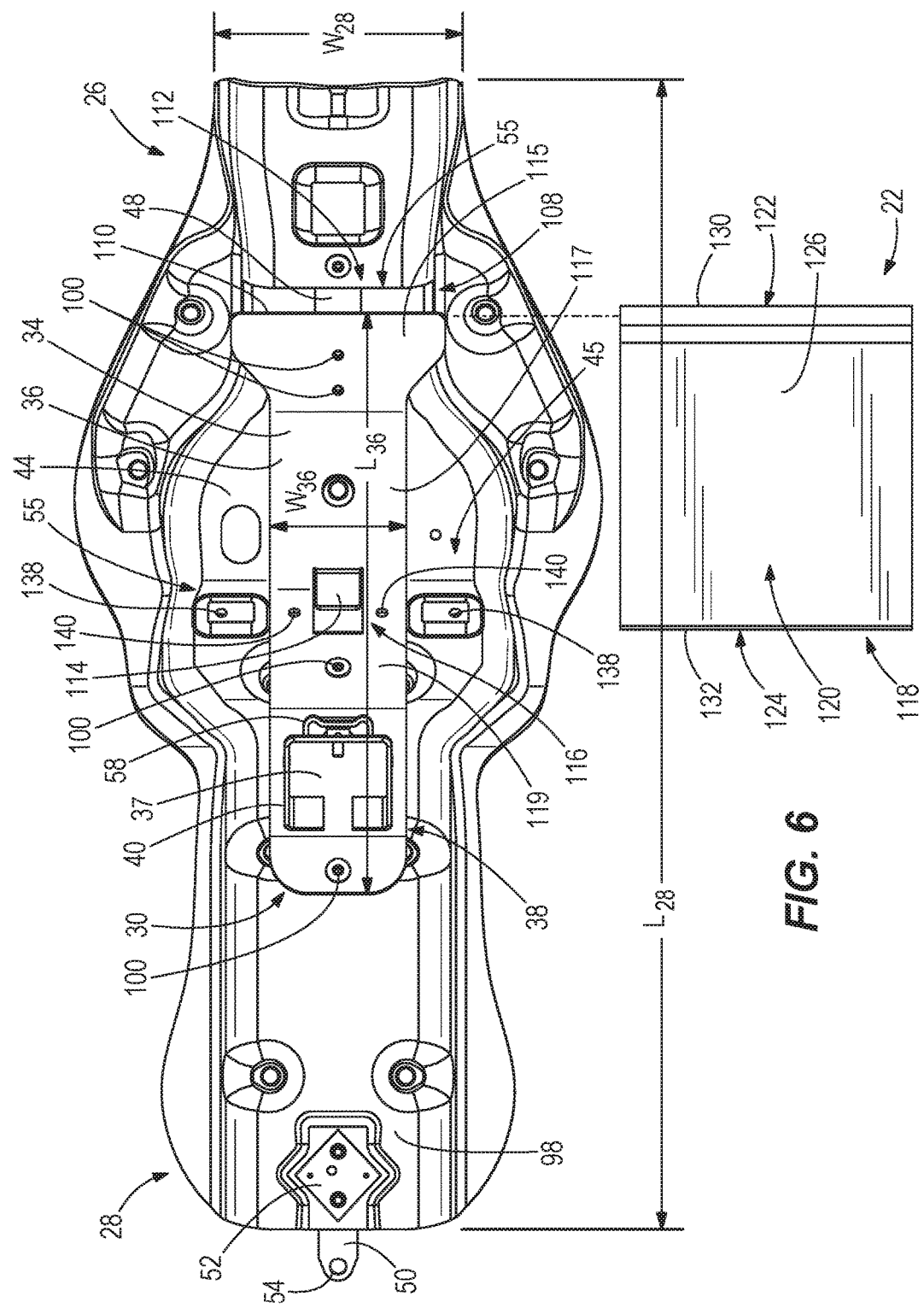
FIG. 6 is a top plan view illustrating a hammock-type load bearing fabric seat suspension assembly in preparation for mounting to the backbone-reinforced seat pan.

With reference to FIGS. 6-8, the webbing 120 is suspended like a generally planar or flat hammock between a pair of spaced apart suspension mounts 122 and 124 that extend transversely relative to a longitudinal extent of the seat pan 28 and which are located at opposite ends of the suspension webbing 120. The suspension mounts 122 and 124, which can be parallel, and transversely-oriented or transversely-extending members, are used to mount the suspension webbing 120 to the seat base assembly 26 of the motorcycle seat assembly 20 that forms motorcycle seat 32 when assembly is finished. One of the mounts is a rear or aft mount 124 that is or includes elongate generally transversely oriented suspension mounting beam 132 that is attached to the rear or aft edge or end of the webbing 120. The other one of the mounts is a fore or front suspension mount 122 that is or includes an elongate and generally transversely oriented J-hook 130 having a J-shaped or U-shaped channel or hook that receives the suspension retainer 110 of the suspension fixturing and mounting tongue 115 disposed at the front of bracket 36.

With specific reference to FIG. 6, the suspension webbing 120 is made of a flexible elastomeric suspension fabric or mesh 126, such as a load-bearing elastomeric mesh or fabric, composed of one or more of the following load-bearing flexible and resilient materials: load-bearing yarn(s), filament(s) and/or thread(s) made of a resilient stretchable thermoplastic material, such as from a polyether ester, polyester ester, or another suitable thermoplastic elastomer, like HYTREL® by E.I. Du Pont de Nemours & Co., Inc., ARNITEL® by Engineering Plastics B.V., or another suitable load-bearing elastomeric suspension fabric or mesh material such as a copolymer elastomer, a copolymer thermoplastic elastomer, a copolyester elastomer or a copolyester thermoplastic elastomer. In some constructions, the suspension webbing 120 is made of woven polyester fabric such as DYMETROL® fabric available from Acme Mills of Detroit, Mich. that is of elastomeric fabric construction.

With reference once again to FIGS. 6-8, as previously indicated, one of the suspension mounts 122 of the stretchable fabric or mesh suspension assembly 118, e.g., the fore or front suspension mount 122, is or includes a suspension mounting hook 128, such as a J-hook 130, which hooks around the transversely-extending and elongate front or leading end or edge of the suspension mounting retainer 110 of the suspension mounting tongue 115 that forms the front or forward-most located segment of the suspension mounting and support bracket 36 to which the seat suspension assembly 118 is fixed or mounted during motorcycle seat assembly. As also previously indicated, the fore or front edge of the suspension fabric or mesh 126 of the suspension webbing 120 of the suspension assembly 118 is attached to the J-hook 130 along a majority of (e.g., more than 50 percent, more than 75 percent, or more than 90 percent) or the entire length of the fore or front edge of the mesh or fabric 126 of the webbing 120. The mesh or fabric 126 and therefor the webbing 120 can be adhesively attached, stapled, stitched, or otherwise attached to the J-hook 130 in a manner that fixes the fore or front edge of the mesh or fabric 126 to the J-hook 130 thereby attaching the fore or front edge of the webbing 120 to the J-hook 130.

As is also shown in FIGS. 6-8, the rear or aft suspension mount 124 of the seat suspension assembly 118 is or includes the elongate suspension mounting beam 132 that can be or serves as a rear suspension mount of the suspension assembly 118 that also is attached to a rear or aft edge of the elastomeric load-bearing suspension mesh or fabric 126 of the webbing 120 along a majority of (e.g., more than 50 percent, more than 75 percent, or more than 90 percent) or the entire length of the rear or aft edge of the mesh or fabric 126 of the webbing 120. The beam 132 can be a rigid member and can be rectangular. In some constructions, the beam 132 is made of a lightweight and durable material, such as polypropylene, carbon fiber composite, or another suitable material. In addition to beam 132 serving as a suspension mounting beam 132 that facilitates mounting of the rear of the suspension assembly 118 to the seat base assembly 26, the beam 132 can also function as a spring, e.g., a leaf spring, which can help absorb, transfer or otherwise accommodate some of the forces encountered by the seat 32 and suspension 22, e.g., mounted suspension assembly 118, and/or in addition to forces encountered by the suspension webbing 120, during motorcycle operation due to the load of the rider or operator, lateral and/or longitudinal accelerations from bumps, jolts and the like, and/or road and/or chassis vibration transferred to the beam 132 via the webbing 120. The mesh or fabric 126 of the webbing 120 can be adhesively attached, stapled, stitched, or otherwise attached to the beam 132 in a manner that fixes the rear or aft edge of the suspension mesh or fabric 126 to the beam 132 thereby fixing the rear or aft edge of the webbing 120 to the beam 132.

In one exemplary method of assembling the motorcycle seat assembly 20, the J-hook 130 of the seat suspension assembly 118 is first attached to the outer, front or leading edge of the suspension retainer 110 of the suspension mounting tongue 115 of the suspension fixture 42 of the bracket 36 before the suspension mounting beam 132 is next manipulated by an installer extending the webbing 120 outwardly toward the rear suspension mount 125 inserting the beam 132 into the suspension fixturing pocket 116. In inserting the beam 132 into the pocket 116, an outer edge or lip of the beam 132 is manually leveraged against an inner upper edge or lip of the tab 114 in the manner depicted in FIG. 7 to use the tab 114 as a lever against which force can be manually applied by an installer holding the beam 132 to stretch the webbing 120 enough for the beam 132 to be able to clear the tab 114 so the beam 132 can then be guided, e.g., slidably guided, by the tab 114 into the pocket 116.

When the beam 132 is received in the pocket 116 during assembly of the seat suspension assembly 118 to the fixture 42, the fore or front end of the suspension assembly 118 also is assembled to the fixture 42 by being engaged with and thereby fixtured to the front suspension retainer 110 of the suspension mounting tongue 115 of the fixture 42. When the beam 132 is inserted into the pocket 116, the webbing 120 becomes suspended between the beam 132 and J-hook 130 assembled in the fixture 42, initially causing an amount of tension to be applied to the webbing 120 that is less than the desired minimum suspension operating pre-tension or pre-tension range. When the beam 132 is releasably retained in the pocket 116 and fixtured thereto, the beam 132 is located so the beam 132 overlies the rear suspension mount 125 and also is spaced from the rear suspension mount 125, readying the beam 132 for being fixed or mounted to the mount 125.

To fix or mount the beam 132 to the mount 125, the beam 132 is manually urged toward and optionally against the mount 125 by manually urging the beam 132 toward and/or against the anchor pads 45 and/or adjacent part of the suspension support 35 of bracket 36 disposed between the pads 45 that form the rear mount 125. When the beam 132 is urged toward and optionally against the rear suspension mount 125, it increases the tension in the webbing 120 thereby preloading or pretensioning the webbing 120. After the beam 132 is urged toward and optionally against the rear suspension mount 125 preloading or pre-tensioning the webbing 120, each one of a plurality of suspension mounting fasteners 144 are respectively inserted through a corresponding one of a plurality of bores 138 in the pad(s) 45 and bores 140 in the portion of bracket 36 between the pads 45 aligned with a respective one of bores 134 through beam 132 to fix or mount the beam 132 to the seat base assembly 26. The number of fasteners 144 and corresponding bores 134 can be at least three in some constructions, e.g., four as shown, and the bores 138, 140 can each be provided as a pair. The bores 134 in the beam 132 can be spaced along the entire beam 132 at even intervals, including one bore 134 adjacent each end of the beam 132. A portion of each one of the fasteners 144 that respectively extend through one of the corresponding pairs of aligned bores 134 & 138 and/or 134 & 140, are engaged by a fastener anchoring retainer 142, such as in the form of a washer, nut, e.g., threaded nut, anchor plate, or the like, anchoring the beam 132 against the pads 45 and portion of the bracket 36 disposed between the pads 45 fixing or mounting the beam 132 to the rear suspension mount 125 formed thereby.

As is also shown in FIG. 8, when the beam 132 is maneuvered or otherwise manipulated to insert the beam 132 into the pocket 116 between the retainer tab 114 and underlying part of the rear bracket segment 119 during mounting of the seat suspension assembly 118 to the seat base assembly 26, the beam 132 is releasably and/or movably held in place by the retainer tab 114 enabling some repositioning and/or adjustment, e.g., in a transverse or side-to-side direction, of the position of the pocket-fixtured beam 132 to be manually performed. When the beam 132 is received in the pocket 116, a suspension mounting fastener 144 is inserted through respective suspension mounting bores 138 in the pan 28 (shown in FIG. 6), and/or suspension mounting bores 140 in the bracket 36 (also shown in FIG. 6) to fix and thereby immovably anchor the beam 132 and the rear or aft end of the suspension assembly 118 and/or rear or aft end of the suspension mesh or fabric 126 and/or suspension webbing 120 to the backbone 30 and the pan 28. As is also depicted in FIG. 8, each one of the fasteners 144 is inserted from one side of the seat pan 28 through aligned sets of bores 134 & 138 or 134 & 140, during anchoring of the beam 132 to the pan 28 and is disposed in operative cooperation with a fastener anchoring retainer 142, such as in the form of a washer, nut, e.g., threaded nut, anchor plate, or the like, located on an opposite side of the seat pan 28. In some constructions, each one of the fasteners 144 is a rivet that has a head 146, e.g., mandrel head, at one end disposed on one side of the seat pan 28 and/or backbone 30 and an elongate shank or body 148, e.g., mandrel or pin, extending outwardly from the head 146 that extends through each one of the corresponding sets of aligned bores 134 & 138 or 134 & 140 and engages a fastener anchoring retainer 142 such as a washer, e.g., annular washer, disposed on the opposite side of the seat pan 28 and/or backbone 30 in fixing the rear or aft end of the suspension assembly 118 and the suspension mesh or fabric 126 to the pan 28 and backbone 30.

When the beam 132 is displaced in a preloading or pre-tensioning step from its fixtured location in the pocket 116 so the beam 132 overlies and may be disposed against the pads 45 and/or portion of the bracket 36 extending between the pads 45, an amount of displacement stretches and thereby increases the tension of the webbing 120 from its initial lesser fixtured amount of tension to a final amount of tension that is at least as great as a minimum unloaded suspension pre-tension threshold or which falls within an acceptable unloaded suspension pre-tension range. The amount of displacement can be at least ⅛ inch in some constructions (e.g., at least ¼ inch, or at least ½ inch).

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the claims of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A motorcycle seat assembly comprising:
a seat pan;
a bracket mounted to the seat pan;
a seat suspension assembly including first and second mounts and a webbing of load-supporting fabric or mesh extending between the first and second mounts, wherein the webbing is spaced above a portion of the seat pan underlying the seat suspension assembly;
a seat suspension assembly fixture provided at least in part by the bracket and including first and second spaced apart retainers configured to engage the first and second mounts of the seat suspension assembly with the first mount engaging the first retainer and the second mount slidably guided by the second retainer so that the seat suspension assembly is in a fixtured configuration in which the webbing has less than a threshold operating tension; and
a fastener configured to transition the seat suspension assembly from the fixtured configuration to a mounted configuration in which the fastener secures the second mount of the seat suspension assembly with respect to the seat pan and the bracket, wherein the second mount of the seat suspension assembly is in a position spaced from the second retainer in the mounted configuration so that the webbing is held with at least the threshold operating tension.

2. The motorcycle seat assembly of claim 1, wherein the first retainer and the second retainer are provided by the bracket and the first retainer provides a first bracket mount to which the first mount of the seat suspension assembly is immovably secured.

3. The motorcycle seat assembly of claim 1, wherein the fastener is engaged with a mount of the bracket to secure the second mount of the seat suspension assembly thereto.

4. The motorcycle seat assembly of claim 3, further comprising an additional fastener securing the second mount of the seat suspension assembly to the seat pan alongside the bracket.

5. The motorcycle seat assembly of claim 1, wherein the first retainer is formed by a mounting tongue of the bracket and the second retainer is formed by a retainer tab of the bracket.

6. The motorcycle seat assembly of claim 5, wherein the retainer tab forming the second retainer at least partially defines a mounting pocket for receiving the second mount of the seat suspension assembly.

7. The motorcycle seat assembly of claim 5, wherein the second retainer is aft of the first retainer.

8. The motorcycle seat assembly of claim 1, wherein the second mount of the seat suspension assembly comprises an elongate transversely-extending suspension mounting beam that is anchored to the bracket by the fastener and anchored to the seat pan on opposing sides of the bracket by two additional fasteners.

9. The motorcycle seat assembly of claim 1, wherein the bracket is elongate and extends centrally longitudinally along a seat saddle portion of the seat pan that underlies a driver or operator sitting in the motorcycle seat assembly, the bracket providing a backbone to the seat pan that reinforces the seat pan.

10. The motorcycle seat assembly of claim 1, wherein the seat base assembly further comprises a plurality of pairs of vibration isolators disposed on a bottom side of the seat pan and adapted to face a chassis or frame of a motorcycle to which the motorcycle seat assembly is mounted.

11. The motorcycle seat assembly of claim 1, wherein the bracket has a length greater than one-half of the length of the seat pan.

12. The motorcycle seat assembly of claim 1, wherein the bracket has a width greater than one-half of the width of the seat pan at the point of narrowest width of the seat pan.

13. The motorcycle seat assembly of claim 1, wherein the bracket has a length greater than one-half of the length of the seat pan and the bracket has a width greater than one-half of the width of the seat pan at the point of narrowest portion or section of the seat pan.

14. The motorcycle seat assembly of claim 1, wherein the webbing is comprised of an elastomeric mesh or fabric.

15. The motorcycle seat assembly of claim 14, wherein the elastomeric mesh or fabric of the webbing is comprised of woven polyester, a copolymer elastomer, a copolymer thermoplastic elastomer, a copolyester elastomer, or a copolyester thermoplastic elastomer.

16. The motorcycle seat assembly of claim 1, wherein the webbing is under a first non-zero amount of pretension when the seat suspension assembly is in the fixtured configuration.

17. The motorcycle seat assembly of claim 1, wherein the bracket comprises a backrest mounting support for mounting a backrest thereto.

18. The motorcycle seat assembly of claim 17, further comprising a removable and position-adjustable backrest mounted to the backrest mounting support of the bracket.

19. The motorcycle seat assembly of claim 18, wherein the removable and position-adjustable backrest is height adjustable and angle adjustable.

* * * * *